(12) United States Patent
Li et al.

(10) Patent No.: US 11,809,273 B2
(45) Date of Patent: Nov. 7, 2023

(54) METHOD FOR DETECTING FLASH MEMORY MODULE AND ASSOCIATED SYSTEM ON CHIP

(71) Applicant: Realtek Semiconductor Corp., HsinChu (TW)

(72) Inventors: Jia-Jhe Li, HsinChu (TW); Chia-Liang Hung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 64 days.

(21) Appl. No.: 17/711,059

(22) Filed: Apr. 1, 2022

(65) Prior Publication Data

US 2022/0365843 A1 Nov. 17, 2022

(30) Foreign Application Priority Data

May 17, 2021 (TW) .................................. 110117625

(51) Int. Cl.
*G06F 11/10* (2006.01)
*G06F 9/30* (2018.01)
*G06F 3/06* (2006.01)

(52) U.S. Cl.
CPC ........ *G06F 11/1004* (2013.01); *G06F 3/0619* (2013.01); *G06F 3/0658* (2013.01); *G06F 3/0679* (2013.01); *G06F 9/30145* (2013.01)

(58) Field of Classification Search
CPC .. G06F 11/1004; G06F 3/0619; G06F 3/0658; G06F 3/0679; G06F 9/30145
See application file for complete search history.

(56) References Cited

U.S. PATENT DOCUMENTS

| | | | |
|---|---|---|---|
| 2003/0208667 A1* | 11/2003 | Langford | G06F 8/65 711/170 |
| 2006/0184721 A1* | 8/2006 | Chen | G06F 13/1694 711/103 |
| 2007/0067520 A1* | 3/2007 | Maddali | G06F 13/1694 710/104 |
| 2008/0288715 A1* | 11/2008 | Maddali | G11C 16/20 711/204 |
| 2012/0110241 A1* | 5/2012 | Lam | G11C 16/20 711/E12.008 |
| 2020/0167227 A1* | 5/2020 | Her | G11C 29/52 |

* cited by examiner

*Primary Examiner* — Albert Decady
*Assistant Examiner* — Enamul M Kabir
(74) *Attorney, Agent, or Firm* — Winston Hsu

(57) ABSTRACT

The present invention provides a method for detecting a flash memory module and an associated SoC. The method reads data in a flash memory module with a specific data format, and then determining a plurality of characteristic parameters of the flash memory module and a size of a page by decoding and checking the data. Therefore, the SoC does not need to design a one-time-programmable memory or strap pins, so as to reduce the manufacturing cost of the SoC.

14 Claims, 4 Drawing Sheets

METHOD FOR DETECTING FLASH MEMORY MODULE AND ASSOCIATED SYSTEM ON CHIP

BACKGROUND OF THE INVENTION

1. Field of the Invention

The present invention relates to flash memory.

2. Description of the Prior Art

Because of its faster access speed and lower manufacturing cost, flash memory has gradually become the mainstream storage device for embedded systems. However, because the flash memory is still in the stage of vigorous development, the flash memories with different manufacturers or different models may have different characteristic parameters, for example, the characteristic parameters such as page size, spare size, address cycle, error correction code (ECC) requirements . . . etc. for the flash memories may be different. These differences not only make different flash memories have different access methods, but also require different data formats. Therefore, in order to read the data stored in the flash memory, a system on chip (SoC) needs obtain the correct characteristic parameters and data format according to an one time programmable (OTP) memory or a strap pin, to correctly read the data stored in the flash memory.

Specifically, in the setting of the flash memory and related SoC, firstly, engineers need to correctly set the OTP memory or the strap pin according to the characteristic parameters of the flash memory to be used. Then, data is generated with an appropriate format according to ECC requirements of the flash memory and a size of a spare area, and then the data is written into the flash memory. Then, after the electronic device is powered on, the SoC will enable a flash memory controller to read the data stored in the flash memory according to the information on the strap pin. However, once the flash memory with different manufacturer or different model is used, the strap pin and data format must be adjusted accordingly so that the SoC can correctly read the data on the flash memory, thus increasing the configuration complexity of the flash memory and the SoC.

SUMMARY OF THE INVENTION

It is therefore an objective of the present invention to provide a method for detecting characteristic parameters of the flash memory, which can obtain the characteristic parameters of the flash memory by reading the flash memory and analyzing its content without using the OTP memory and the strap pin, so as to solve the problem in the prior art.

According to one embodiment of the present invention, a method for detecting a flash memory module comprises the steps of: (a) selecting one of a plurality of sets of characteristic parameters to configure a flash memory controller; (b) reading P-byte data from the flash memory module according to a row address and a column address, wherein the P-byte data comprises a data area, a tag area and an error correct code (ECC) area within a page of a block within the flash memory module; (c) decoding the P-byte data, and if the decoding operation fails, adjusting the row address and entering Step (b) to read another P-byte data from the flash memory module; (d) if the P-byte data is successfully decoded, using a check code in the tag area to determine if decoded data obtained in Step (c) is correct, and if the decoded data is correct, adjusting the column address and entering Step (b) to read another P-byte data from the flash memory module; and (e) if the Step (d) determines that the decoded data is not correct, determining characteristic parameters of the flash memory module according to the currently used set of characteristic parameters and the current column address.

According to one embodiment of the present invention, a SoC comprising a central processing unit is disclosed. The central processing unit is configured to execute a program code to perform the steps of: (a) selecting one of a plurality of sets of characteristic parameters to configure a flash memory controller; (b) reading P-byte data from the flash memory module according to a row address and a column address, wherein the P-byte data comprises a data area, a tag area and an error correct code (ECC) area within a page of a block within the flash memory module; (c) decoding the P-byte data, and if the decoding operation fails, adjusting the row address and entering Step (b) to read another P-byte data from the flash memory module; (d) if the P-byte data is successfully decoded, using a check code in the tag area to determine if decoded data obtained in Step (c) is correct, and if the decoded data is correct, adjusting the column address and entering Step (b) to read another P-byte data from the flash memory module; and (e) if the Step (d) determines that the decoded data is not correct, determining characteristic parameters of the flash memory module according to the currently used set of characteristic parameters and the current column address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
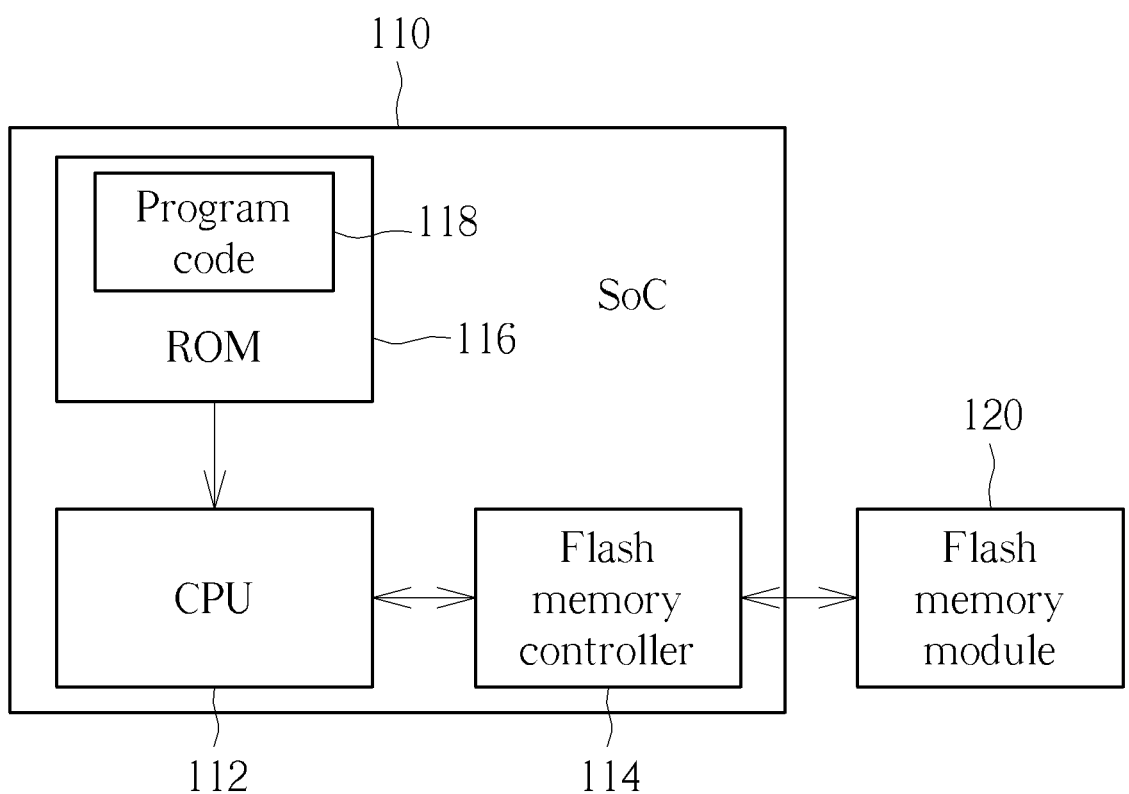
FIG. 1 is a diagram illustrating a SoC and a flash memory module according to one embodiment of the present invention.

FIG. 1 is a diagram illustrating a SoC 110 and a flash memory module 120 according to one embodiment of the present invention. As shown in FIG. 1, the SoC 110 comprises a central processing unit (CPU) 112, a flash memory controller 114, and a read-only memory (ROM) 116, where the ROM 116 includes a program code 118. In this embodiment, the SoC 110 and the flash memory module 120 can be positioned within any electronic device, for example, the SoC 110 and the flash memory module 120 are within in a network device such as a switch.

Figure 2:
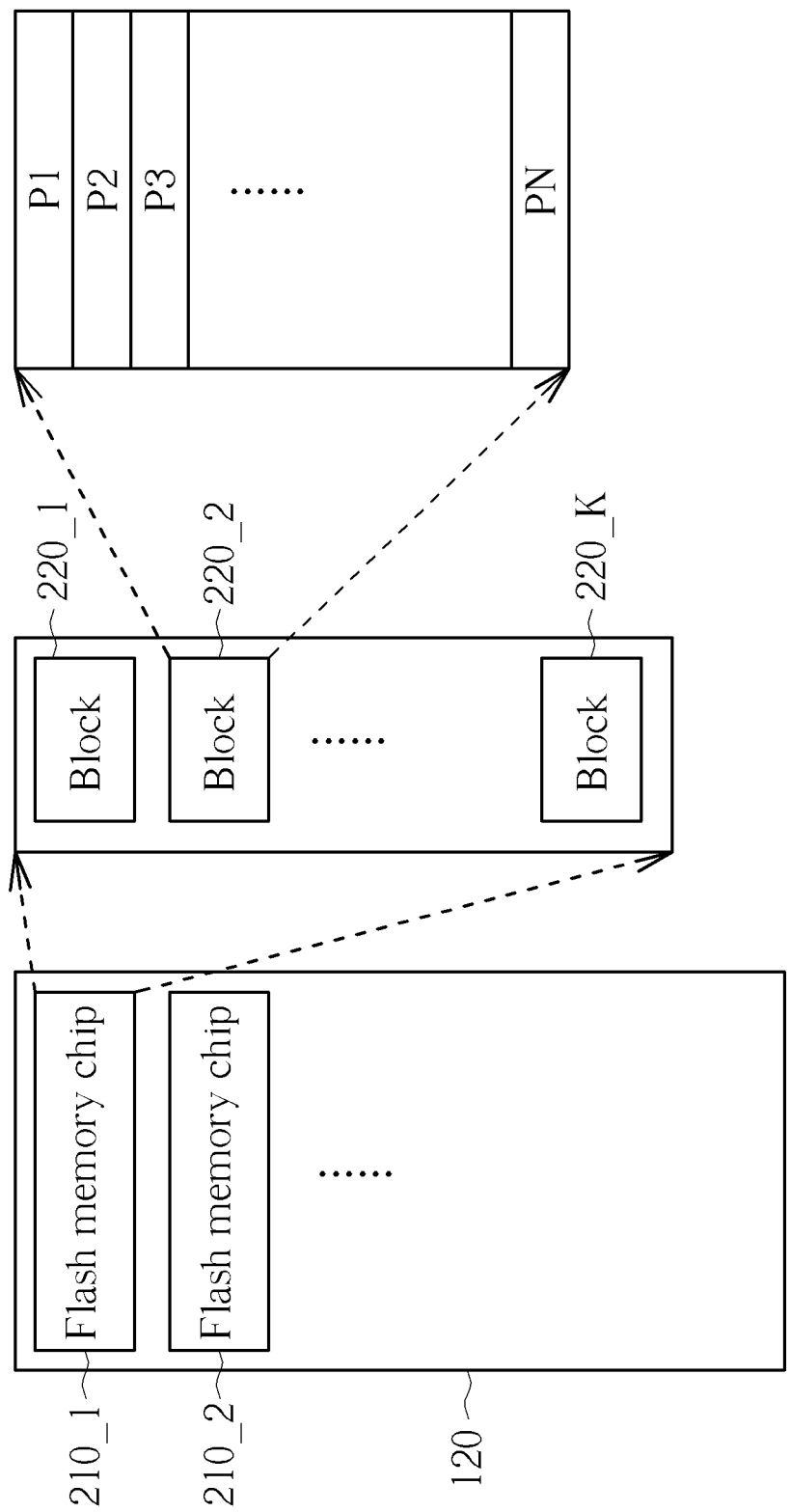
FIG. 2 is a diagram illustrating the flash memory module.

FIG. 2 is a diagram illustrating the flash memory module 120. As shown in FIG. 2, the flash memory module 120 comprises at least one flash memory chip (in this embodiment, FIG. 2 shows two flash memory chips 210_1 and 210_2), and each flash memory chip comprises a plurality of blocks 220_1-220_K, wherein each of the blocks 220_1-220_K is a minimum erasing unit, that is, all the data in the block needs to be erased together. In addition, each block comprises a plurality of pages P1-PN, and each page is a minimum write unit.

In this embodiment, some data is written in the flash memory module 120 in advance, so that the SoC 110 can read the data after power-on to perform related operations. For example, before the flash memory module 120 is connected to the SoC 110, the data required by the system chip 110 can be written to the flash memory module 120 in advance in the factory. When the SoC 110 and the flash memory module 120 are installed in an electronic device, the SoC 110 can read the flash memory module 120 to perform related operations. However, as described in the prior art, the flash memory module 120 may have different characteristic parameters such as page size, spare size, address cycle and ECC requirements due to different manufacturers or different models, therefore, the prior art is necessary to obtain the correct characteristic parameters and data format through an OTP memory or a strap pin for the correct setting of the flash memory controller 114, but this method will increase the design complexity of the SoC 110. In order to solve this problem, the SoC 110 of this embodiment does not need the above-mentioned OTP memory or strap pin, but by designing the program code 118 having an algorithm capable of actively detecting the characteristic parameters of the flash memory module 120, wherein the algorithm can accurately and quickly detect at least part of the characteristic parameters of the flash memory module 120 when the SoC 110 is powered on for the first time, so as to configure the flash memory controller 114 for the following operations related to accessing the flash memory module 120.

Figure 3:
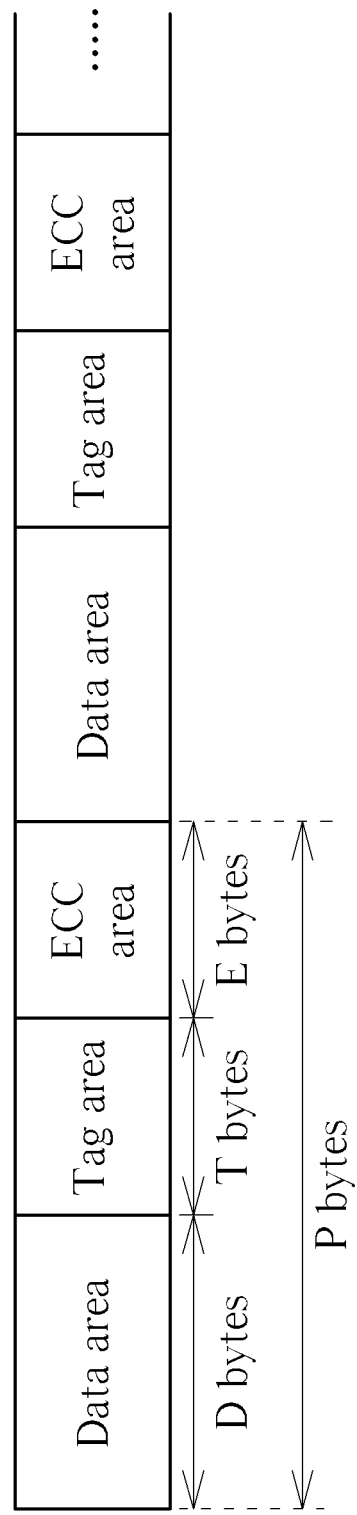
FIG. 3 shows a format of data written into the flash memory module according to one embodiment of the present invention.

Specifically, the data written into the flash memory module 120 can have a fixed data format. Referring to FIG. 3, the data that needs to be written to the flash memory module 120 can be divided into a plurality of data areas, where a size of each data area is D bytes; for each data area, a tag area with a length of T bytes is added, where the content of the tag area may comprise a serial number of the corresponding data area and the related check code, and the check code may be a cyclic redundancy check (CRC) of the corresponding data area. In addition, for each data area and the corresponding tag area, an ECC area with a length of E bytes is added, wherein the contents of the ECC area are used to correct errors in the data within the data area and the tag area. In one embodiment, the page size of flash memory modules 120 with different manufacturers or different models usually has a multiple relationship, for example, the page size of the flash memory module 120 may be 512 bytes, 1024 bytes or 2048 bytes. Therefore, when designing the aforementioned data area, tag area and ECC area, the sum of the data size can be designed as a highest common factor P of the page sizes of various flash memory modules 120, wherein P=D+T+E, but the present invention is not limited to this. In one embodiment, P may be 512 bytes.

Figure 4:
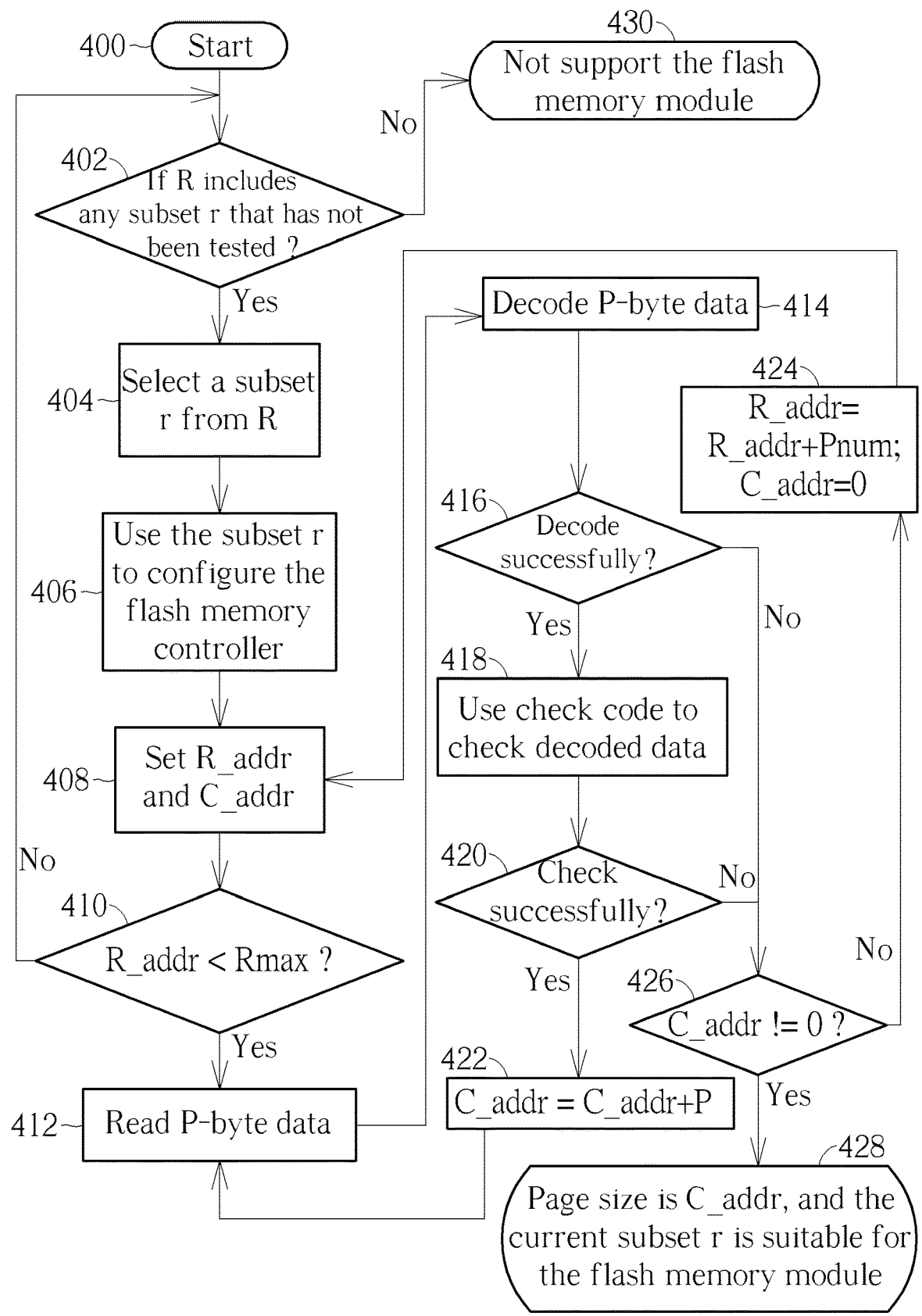
FIG. 4 is a flowchart of a method for determining characteristic parameters of the flash memory module according to one embodiment of the present invention.

Then, when the SoC 110 and the flash memory module 120 are set in an electronic device, and the electronic device is powered on, the CPU 112 reads the program code 118 from the ROM 116 and executes the program code 118 to perform the operation shown in FIG. 4 to detect the characteristic parameters of the flash memory module 120. In the following description, it is assumed that a highest common factor of a number of pages included in each block of the flash memory module 120 corresponding to different manufacturers or different models is 'Pnum', a reference row number corresponding to a number of allowable bad blocks is 'Rmax', a set of some characteristic parameters to be tested is R, where R comprises a plurality of subsets r1, r2, . . . , and each subset is a set of characteristic parameter combinations, but the set of characteristic parameter combinations does not include the size of the page. In Step 400, the flow starts, and the CPU 112 starts to execute the program code 118. In step 402, the CPU 112 determines if the set of characteristic parameters R still includes a subset that has not been tested. If yes, the flow enters Step 404; and if not, the flow enters Step 430 and the CPU 112 determines that the SoC 110 does not support the flash memory module 120, and the flow is finished. In Step 404, the CPU 112 selects a subset r from the set of characteristic parameters R that has not been tested, and uses the characteristic parameters in the subset r to configure the flash memory controller 114 (Step 406). In Step 408, the flash memory controller 114 selects a set of memory addresses R_addr and C_addr, where R_addr is a row address of the page, and different row addresses indicate different pages, and C_addr is a column address. At the beginning, the row address R_addr and the column address C_addr are both zero, that is, the flash memory controller 114 selects a start address of a first page of the first block in the flash memory module 120.

In Step 410, the CPU 112 determines if the row address R_addr is less than the reference row number Rmax, if yes, the flow enters Step 412; and if not, the flow enters Step 402.

In Step 412, the flash memory controller 114 starts to read P-byte data from the flash memory module 120 having the row address R_addr and the column address C_addr, where the P-byte data includes the data area, tag area and ECC area shown in FIG. 3. In Step 414, the CPU 112 or the flash memory controller 114 performs a decoding operation on the data of the data area, the tag area and the ECC area, that is, the content of the ECC area is used to perform error correction on the content of the data area and the tag area. In Step 416, the CPU 112 or the flash memory controller 114 determines if the decoding operation is successful, if yes, the flow enters Step 418; and if not, the flow enters Step 426. The possible reasons for the above decoding failure may be that the block is a bad block, the read data has encountered a certain boundary (for example, the end of the page), or the characteristic parameters of the current subset r used to configure the flash memory controller 114 are not suitable for the flash memory module 120.

In Step 418, the CPU 112 determines if the decoded data corresponding to the data area obtained in Step 414 is correct according to the check code in the tag area. For example, the decoded data corresponding to the data area is processed by a cyclic redundancy check operation to generate a calculation result, and the CPU 112 determines if the calculation result matches the check code in the tag area to determine if the check is successful. If yes, the flow enters Step 422; and if not, the flow enters Step 426.

In Step 422, the CPU 112 adds the column address C_addr to the P-byte address offset, and the flow goes back to Step 412 to read P-byte data from the row address R_addr and the column address (C_addr+P) in the flash memory module 120, that is, the CPU 112 reads the second set of data area, tag area and ECC area as shown in FIG. 3.

In Step 424, the CPU 112 determines that the current block may be a bad block, that is, part of the data has been damaged. Therefore, in order to avoid wasting too much time in reading the contents of the bad block, the flash memory controller 114 adds the column address R_addr to Pnum, and sets the column address C_addr to zero, and the flow goes back to Step 408. That is, the flash memory controller 114 reads P-byte data from the row address (R_addr+Pnum) and the column address C_addr in the flash memory module 120.

In Step 426, the flash memory controller 114 determines if the column address C_addr is not equal to zero, and if yes, the flow enters Step 428; and if not, because the content of the page is incorrect at the beginning, the CPU 112 or the flash memory controller 114 can determine that the currently read block may be a bad block, and the flow enters Step 424.

In Step 428, since the column address C_addr is not equal to zero, it means that the read data may have encountered a certain boundary such as the end of the page, so the flash memory controller 114 can determine that the current column address C_addr is the page size. The main reason is that the previously read P-byte data can successfully check the content of the data area by using the check code in the tag area, but the currently read P-byte data cannot successfully check the content of the data area by using the check code in the tag area. At this time, the CPU 112 or the flash memory module 114 can determine that the characteristic parameters in the subset r used to configure the flash memory controller 114 are suitable for the flash memory module 120.

In light of above, in the flow shown in FIG. 4, by using different subsets r and the page size determination mechanism, at least part of the characteristic parameters of the flash memory module 120 can be determined accurately and quickly when the SoC 110 is powered on, and the OTP memory or strap pin is not required for the determination of the characteristic parameters and the page size. Therefore, the design and manufacturing cost of the SoC 110 can be effectively reduced.

In one embodiment, the flow in FIG. 4 only needs to be executed when the SoC 110 is powered on for the first time, and after determining the characteristic parameters of the flash memory module 120, the flash memory controller 114 can be configured by using these characteristic parameters for subsequent access to the flash memory module 120.

It should be noted that the values of Pnum and Rmax shown in FIG. 4 are merely illustrative, and not a limitation of the present invention. Specifically, the purpose of using Pnum to adjust row address R_addr in Step 424 is to prevent the flash memory controller 114 from reading the contents of bad blocks many times, and the purpose of using Rmax is to prevent the flash memory controller 114 from continuously using the characteristic parameters of the unsuitable subset to read the flash memory module 120. Therefore, since Pnum and Rmax are used to accelerate the performance of the algorithm, the designer can set any suitable value.

Briefly summarize the method of detecting the flash memory module 120 in FIG. 4, which may sequentially include the following steps: (a) select one of a plurality of sets of characteristic parameters to configure a flash memory controller; (b) read P-byte data from the flash memory module according to a row address and a column address, wherein the P-byte data comprises a data area, a tag area and an error correct code (ECC) area within a page of a block within the flash memory module; (c) decode the P-byte data, and if the decoding operation fails, adjust the row address and enter Step (b) to read another P-byte data from the flash memory module; (d) if the P-byte data is successfully decoded, use a check code in the tag area to determine if decoded data obtained in Step (c) is correct, and if the decoded data is correct, adjust the column address and enter Step (b) to read another P-byte data from the flash memory module; and (e) if the Step (d) determines that the decoded data is not correct, determine if the current column address is a start address of the page, and if current column address is the start address of the page, adjust the row address and enter Step (b) to read another P-byte data from the flash memory module; and if the current column address is not the start address of the page, determine the currently used set of characteristic parameters is suitable for the flash memory module, and determine that the current column address is a size of the page.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting a flash memory module, comprising:
   (a) selecting one of a plurality of sets of characteristic parameters to configure a flash memory controller;
   (b) reading P-byte data from the flash memory module according to a row address and a column address, wherein the P-byte data comprises a data area, a tag area and an error correct code (ECC) area within a page of a block within the flash memory module;
   (c) decoding the P-byte data, and if the decoding operation fails, adjusting the row address and entering Step (b) to read another P-byte data from the flash memory module;
   (d) if the P-byte data is successfully decoded, using a check code in the tag area to determine if decoded data obtained in Step (c) is correct, and if the decoded data is correct, adjusting the column address and entering Step (b) to read another P-byte data from the flash memory module; and
   (e) if the Step (d) determines that the decoded data is not correct, determining characteristic parameters of the flash memory module according to the currently used set of characteristic parameters and the current column address.

2. The method of claim 1, wherein a size of the page is a positive integer multiple of P bytes.

3. The method of claim 1, wherein the tag area comprises a cyclic redundancy check (CRC) of data within the data area, and the ECC area comprises an ECC used to decode the data within the data area and the tag area.

4. The method of claim 1, wherein the Step (e) comprises:
   (e1) if the Step (d) determines that the decoded data is not correct, determining if the current column address is a start address of the page;
   (e2) if the current column address is the start address of the page, adjusting the row address and entering Step (b) to read another P-byte data from the flash memory module; and
   (e3) if the current column address is not the start address of the page, determining the currently used set of characteristic parameters is suitable for the flash memory module, and determining that the current column address is a size of the page.

5. The method of claim 1, wherein the Step (c) comprises:
   (c1) decoding the P-byte data, and if the decoding operation fails, determining if the current column address is a start address of the page;
   (c2) if the current column address is the start address of the page, adjusting the row address and entering Step (b) to read another P-byte data from the flash memory module; and
   (c3) if the current column address is not the start address of the page, determining the currently used set of characteristic parameters is suitable for the flash memory module, and determining that the current column address is a size of the page.

6. The method of claim 1, wherein the Step (c) comprises: decoding the P-byte data, and if the decoding operation fails, adjusting the row address to generate an adjusted row address corresponding another page different from the page, setting the column address to be a start address of the another page, and entering Step (b) to read another P-byte data from the flash memory module according to the adjusted row address and the column address.

7. The method of claim 1, further comprising:
determining if the row address in Step (b) is greater than a reference row number or not;
if it is determined that the row address in Step (b) is greater than the reference row number, entering Step (a) to select another one of the plurality of sets of characteristic parameters to configure the flash memory controller; and
if it is determined that the row address in Step (b) is not greater than the reference row number, using the flash memory controller to read the P-byte data from the flash memory module according to the row address and the column address.

8. A system on chip (SoC), comprising:
a central processing unit, configured to execute a program code to perform the steps of:
  (a) selecting one of a plurality of sets of characteristic parameters to configure a flash memory controller;
  (b) reading P-byte data from the flash memory module according to a row address and a column address, wherein the P-byte data comprises a data area, a tag area and an error correct code (ECC) area within a page of a block within the flash memory module;
  (c) decoding the P-byte data, and if the decoding operation fails, adjusting the row address and entering Step (b) to read another P-byte data from the flash memory module;
  (d) if the P-byte data is successfully decoded, using a check code in the tag area to determine if decoded data obtained in Step (c) is correct, and if the decoded data is correct, adjusting the column address and entering Step (b) to read another P-byte data from the flash memory module; and
  (e) if the Step (d) determines that the decoded data is not correct, determining characteristic parameters of the flash memory module according to the currently used set of characteristic parameters and the current column address.

9. The SoC of claim 8, wherein a size of the page is a positive integer multiple of P bytes.

10. The SoC of claim 8, wherein the tag area comprises a cyclic redundancy check (CRC) of data within the data area, and the ECC area comprises an ECC used to decode the data within the data area and the tag area.

11. The SoC of claim 8, wherein the Step (e) comprises:
  (e1) if the Step (d) determines that the decoded data is not correct, determining if the current column address is a start address of the page;
  (e2) if the current column address is the start address of the page, adjusting the row address and entering Step (b) to read another P-byte data from the flash memory module; and
  (e3) if the current column address is not the start address of the page, determining the currently used set of characteristic parameters is suitable for the flash memory module, and determining that the current column address is a size of the page.

12. The SoC of claim 8, wherein the Step (c) comprises:
  (c1) decoding the P-byte data, and if the decoding operation fails, determining if the current column address is a start address of the page;
  (c2) if the current column address is the start address of the page, adjusting the row address and entering Step (b) to read another P-byte data from the flash memory module; and
  (c3) if the current column address is not the start address of the page, determining the currently used set of characteristic parameters is suitable for the flash memory module, and determining that the current column address is a size of the page.

13. The SoC of claim 8, wherein the Step (c) comprises:
decoding the P-byte data, and if the decoding operation fails, adjusting the row address to generate an adjusted row address corresponding another page different from the page, setting the column address to be a start address of the another page, and entering Step (b) to read another P-byte data from the flash memory module according to the adjusted row address and the column address.

14. The SoC of claim 8, further comprising:
determining if the row address in Step (b) is greater than a reference row number or not;
if it is determined that the row address in Step (b) is greater than the reference row number, entering Step (a) to select another one of the plurality of sets of characteristic parameters to configure the flash memory controller; and
if it is determined that the row address in Step (b) is not greater than the reference row number, using the flash memory controller to read the P-byte data from the flash memory module according to the row address and the column address.

* * * * *